(12) United States Patent
Chewins

(10) Patent No.: US 10,199,146 B2
(45) Date of Patent: *Feb. 5, 2019

(54) REMOVABLE FLUID BARRIER

(71) Applicant: Elliott Chewins, Toronto (CA)

(72) Inventor: Elliott Chewins, Toronto (CA)

( * ) Notice: Subject to any disclaimer, the term of this patent is extended or adjusted under 35 U.S.C. 154(b) by 35 days.

This patent is subject to a terminal disclaimer.

(21) Appl. No.: 15/662,540

(22) Filed: Jul. 28, 2017

(65) Prior Publication Data

US 2017/0323715 A1   Nov. 9, 2017

Related U.S. Application Data

(63) Continuation-in-part of application No. 14/498,176, filed on Sep. 26, 2014, now Pat. No. 9,779,863.

(51) Int. Cl.
| | |
|---|---|
| *H01F 7/02* | (2006.01) |
| *B65D 90/22* | (2006.01) |
| *B29C 33/12* | (2006.01) |
| *B29C 33/42* | (2006.01) |
| *B29C 39/02* | (2006.01) |
| *B29C 39/10* | (2006.01) |
| *B29C 39/12* | (2006.01) |
| *B63B 43/16* | (2006.01) |
| *B29L 31/00* | (2006.01) |
| *B29K 105/20* | (2006.01) |
| *B29C 39/00* | (2006.01) |
| *B29K 75/00* | (2006.01) |

(52) U.S. Cl.
CPC .......... *H01F 7/0221* (2013.01); *B29C 33/12* (2013.01); *B29C 33/424* (2013.01); *B29C 39/025* (2013.01); *B29C 39/10* (2013.01); *B29C 39/123* (2013.01); *B63B 43/16* (2013.01); *B65D 90/22* (2013.01); *B29C 39/006* (2013.01); *B29K 2075/00* (2013.01); *B29K 2105/203* (2013.01); *B29L 2031/7126* (2013.01); *B29L 2031/7154* (2013.01); *Y10T 428/24008* (2015.01)

(58) Field of Classification Search
CPC . Y10T 428/24008; H01F 7/02; H01F 7/0221; B63B 43/16; F16L 55/1683
See application file for complete search history.

(56) References Cited

U.S. PATENT DOCUMENTS

| | | | | |
|---|---|---|---|---|
| 3,546,643 | A * | 12/1970 | Virostek | H01F 7/0215 335/303 |
| 8,717,130 | B2 * | 5/2014 | Zapf | C09D 5/084 156/330 |
| 8,822,008 | B2 * | 9/2014 | Keough | B01F 15/00837 193/2 R |
| 9,779,863 | B2 * | 10/2017 | Chewins | H01F 7/0205 |

FOREIGN PATENT DOCUMENTS

WO   WO-9204574 A1 *  3/1992  ............. B63B 43/16

* cited by examiner

*Primary Examiner* — Alexander S Thomas

(57) ABSTRACT

A removable fluid barrier comprises a generally planar flexible body fabricated of at least one resilient material and encapsulating a plurality of permanent magnets. The flexible body has an outer face defining a sealing surface of the removable fluid barrier.

15 Claims, 14 Drawing Sheets

REMOVABLE FLUID BARRIER

CROSS-REFERENCE TO RELATED APPLICATION

This application is a continuation-in-part of U.S. application Ser. No. 14/498,176 filed on Sep. 26, 2014, now U.S. Pat. No. 9,779,863 issued Oct. 3, 2017, the entire content of which is incorporated herein by reference in its entirety.

FIELD OF THE INVENTION

The present invention relates generally to fluid containment, and in particular to a removable fluid barrier.

BACKGROUND OF THE INVENTION

Storage and transportation of hazardous fluids, such as hazardous liquids and gases, is known to be problematic, as any rupture that occurs in the tank containing the fluid can be difficult to mend quickly while fluid is still in the tank. Such ruptures typically result in leakage and/or spillage of hazardous fluid from the tank, which can contaminate and damage the surrounding environment.

For example, if a rail tank car is involved in a rail accident, it has been found that the leakage of the fluids from the ruptured tank car(s) into the surrounding environment is not easily prevented. Similar difficulties exist for other for fluid transport vehicles, such as rail tank cars and highway tanker trucks, as well as static fluid containers, such as unpressurized fluid storage tanks and 55 gallon drums. As most fluid transport vehicles and static fluid containers do not have internal baffles, the amount of fluid leakage in such cases can be significant.

A conventional approach to deal with such a rupture is to plug the rupture with a wooden peg. However, in many instances, the use of a wooden peg is inadequate to completely stop fluid flow through the plugged rupture.

Removable fluid barriers have also been considered. For example, International PCT Application No. WO 1992004574 to Goulding describes an apparatus that includes an aluminum backing plate onto which a sponge rubber layer is bonded. The sponge rubber layer has an impervious skin, which is impervious to liquids contained in a transport tanker or tank made of steel or another ferrous material to which the apparatus is to be applied for sealing a rupture therein. At the periphery of the backing plate are a set of eight permanent magnets which are also bonded to the aluminum plate. When a rupture occurs in the tanker or tank, the apparatus may be used to stem the flow of the leak by fastening the magnets to the tanker or tank to thereby compress the sponge rubber layer against the rupture.

Improvements are generally desired. It is therefore an object at least to provide a novel removable fluid barrier.

SUMMARY OF THE INVENTION

In one aspect, there is provided a removable fluid barrier, comprising: a generally planar flexible body fabricated of at least one resilient material and encapsulating a plurality of permanent magnets, the flexible body having an outer face defining a sealing surface of the removable fluid barrier.

The flexible body may be formed by a single casting. The flexible body may have a single, unitary structure.

The removable fluid barrier may further comprise a reinforcement sheet encapsulated within the flexible body. The reinforcement sheet may be disposed between the plurality of permanent magnets and a first face of the flexible body. The reinforcement sheet may be selected from the group consisting of fiberglass cloth, KEVLAR™ cloth, KEVLAR™ mesh, and a resilient fabric or a resilient mesh fabricated of one or more other materials.

The outer face of the flexible body may comprise a textured surface. The textured surface may have a non-planar topography.

The plurality of permanent magnets may comprise one or more rare earth magnets. Each of the permanent magnets may comprise an epoxy coating.

Each of the permanent magnets may comprise a magnet body and ferromagnetic plate. The ferromagnetic plate may be a steel disc. The magnet body may be a rare earth magnet.

The permanent magnets may comprise two or more magnet bodies magnetically fastened to a ferromagnetic plate. The ferromagnetic plate may be a steel plate or a steel sheet. Each of the magnet bodies may be a rare earth magnet.

The at least one resilient material may comprise a polymer. The flexible body may be fabricated of polyurethane.

BRIEF DESCRIPTION OF THE DRAWINGS

Embodiments will now be described more fully with reference to the accompanying drawings in which.

DETAILED DESCRIPTION OF THE EMBODIMENTS

Figure 1:
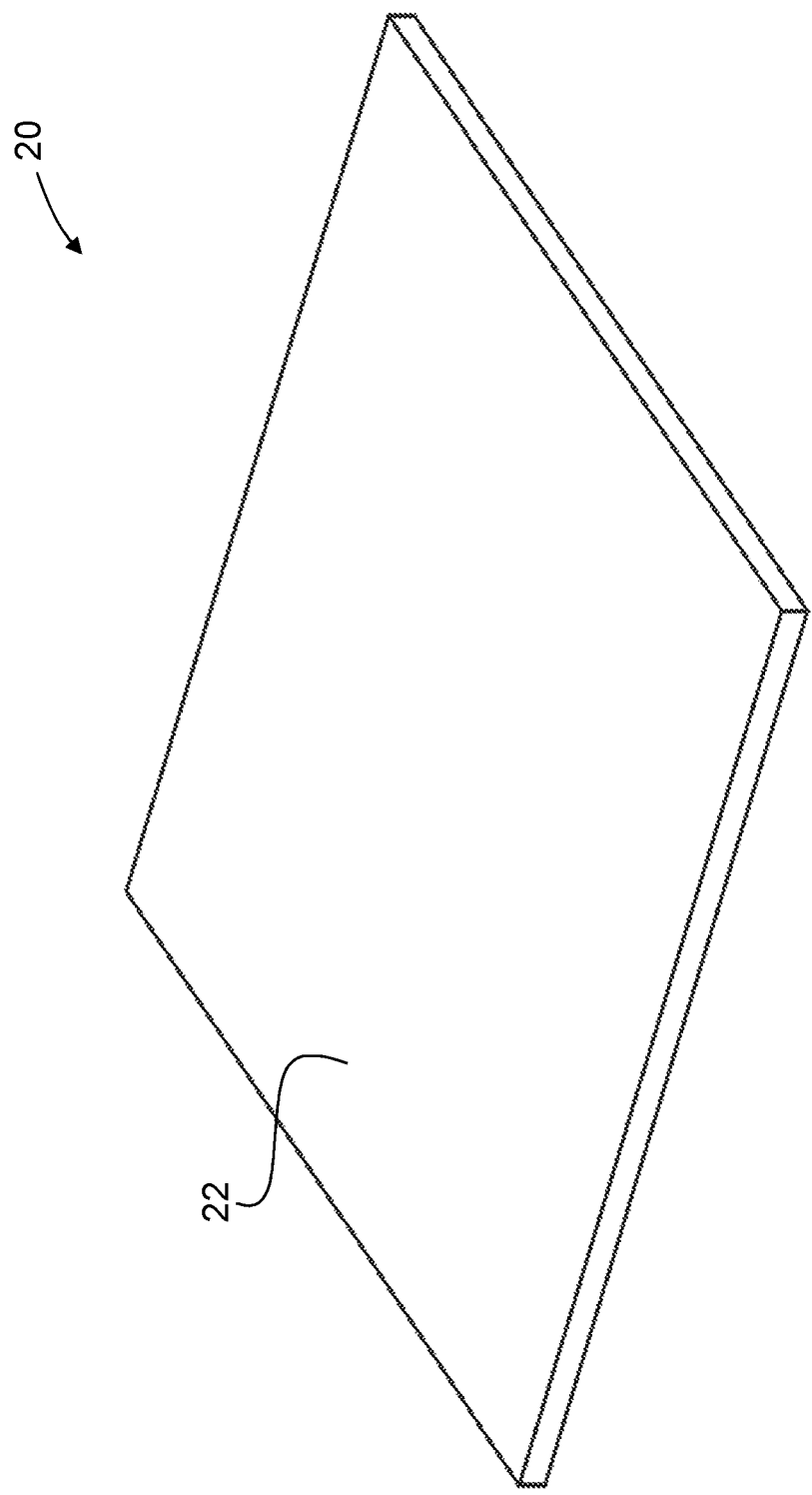
FIG. 1 is a perspective view of a removable fluid barrier.
Figure 2:
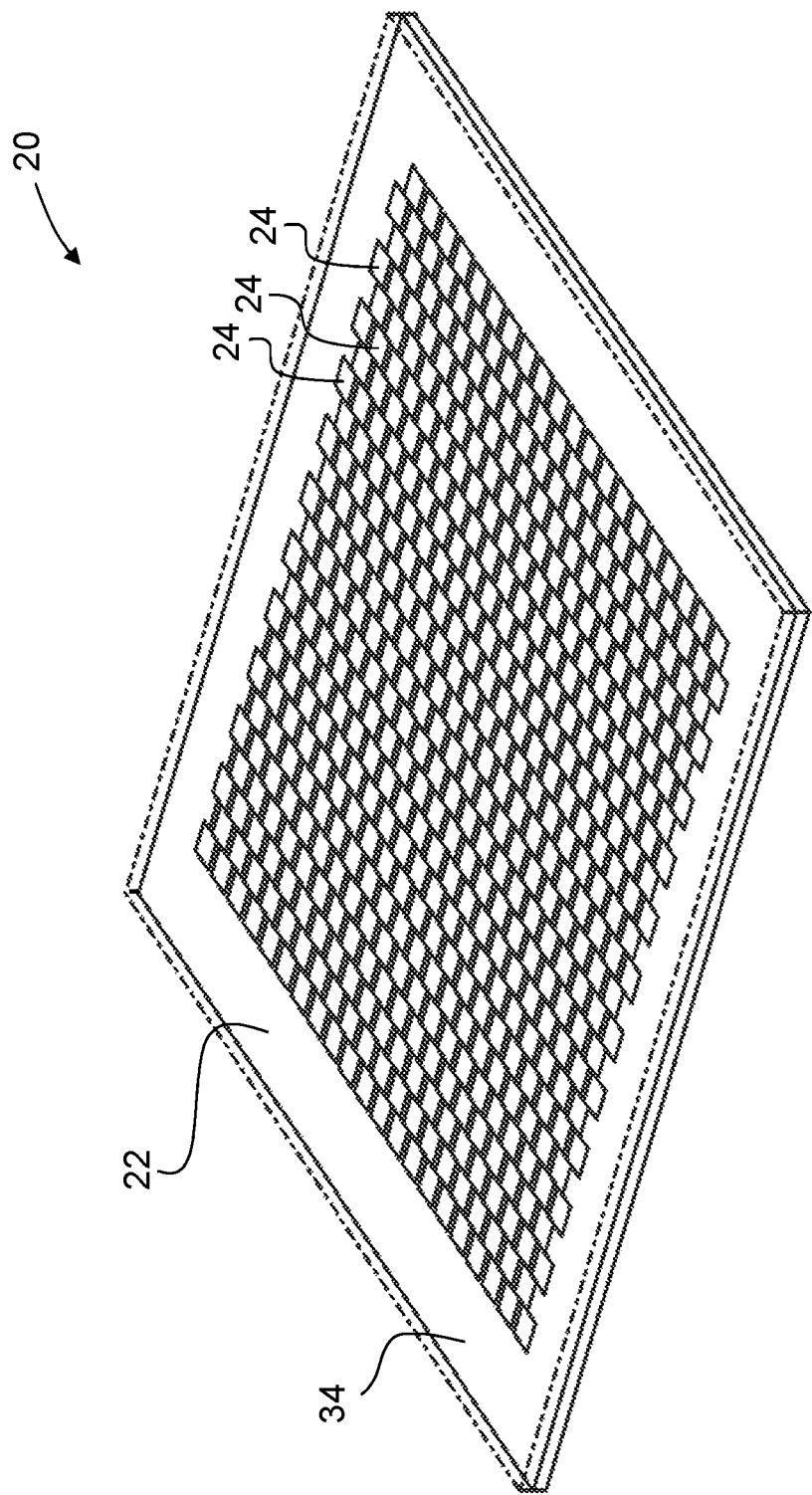
FIG. 2 is a perspective, partially transparent view of the removable fluid barrier of FIG. 1.
Figure 3:
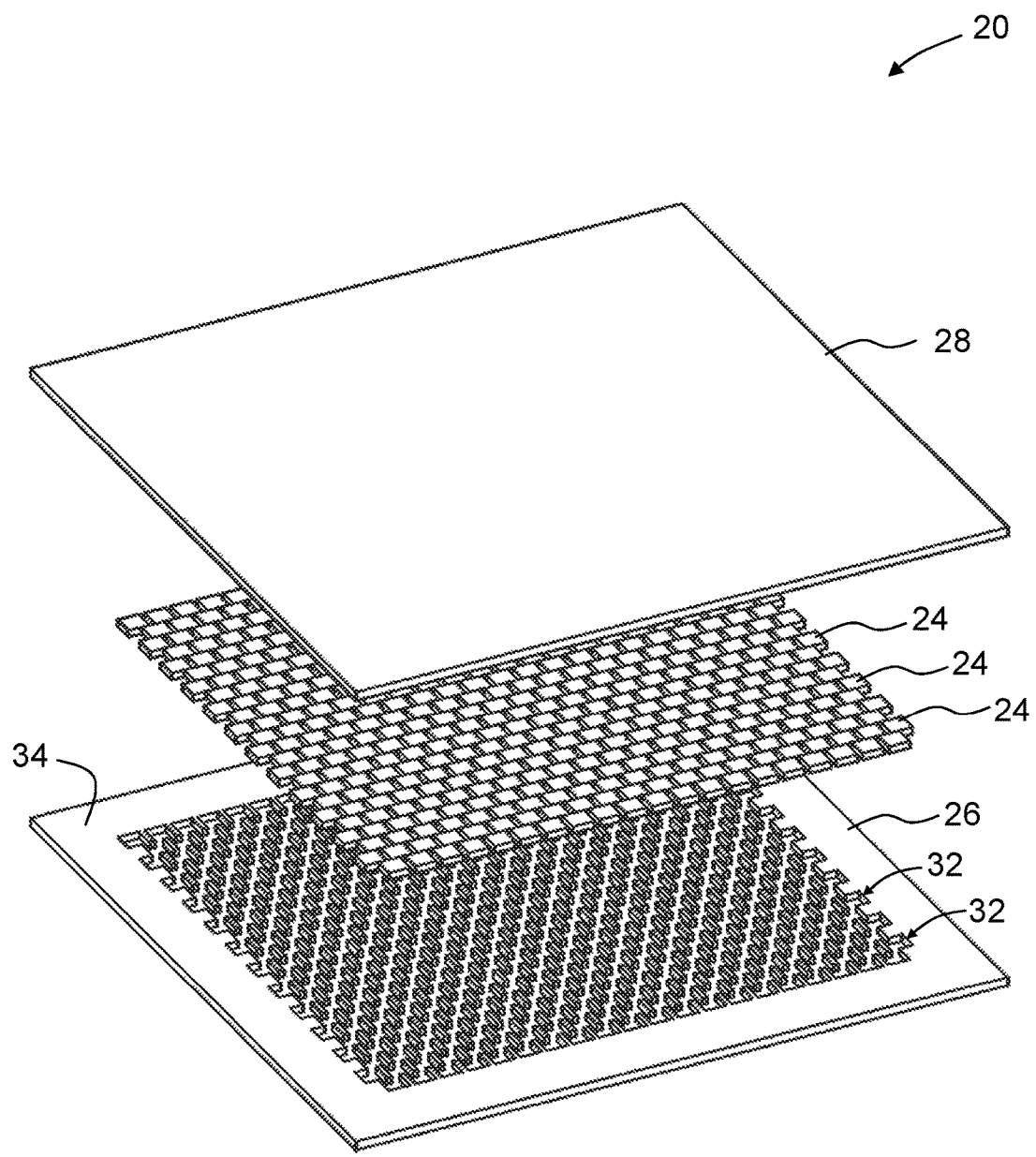
FIG. 3 is an exploded view of the removable fluid barrier of FIG. 1.
Figure 4:
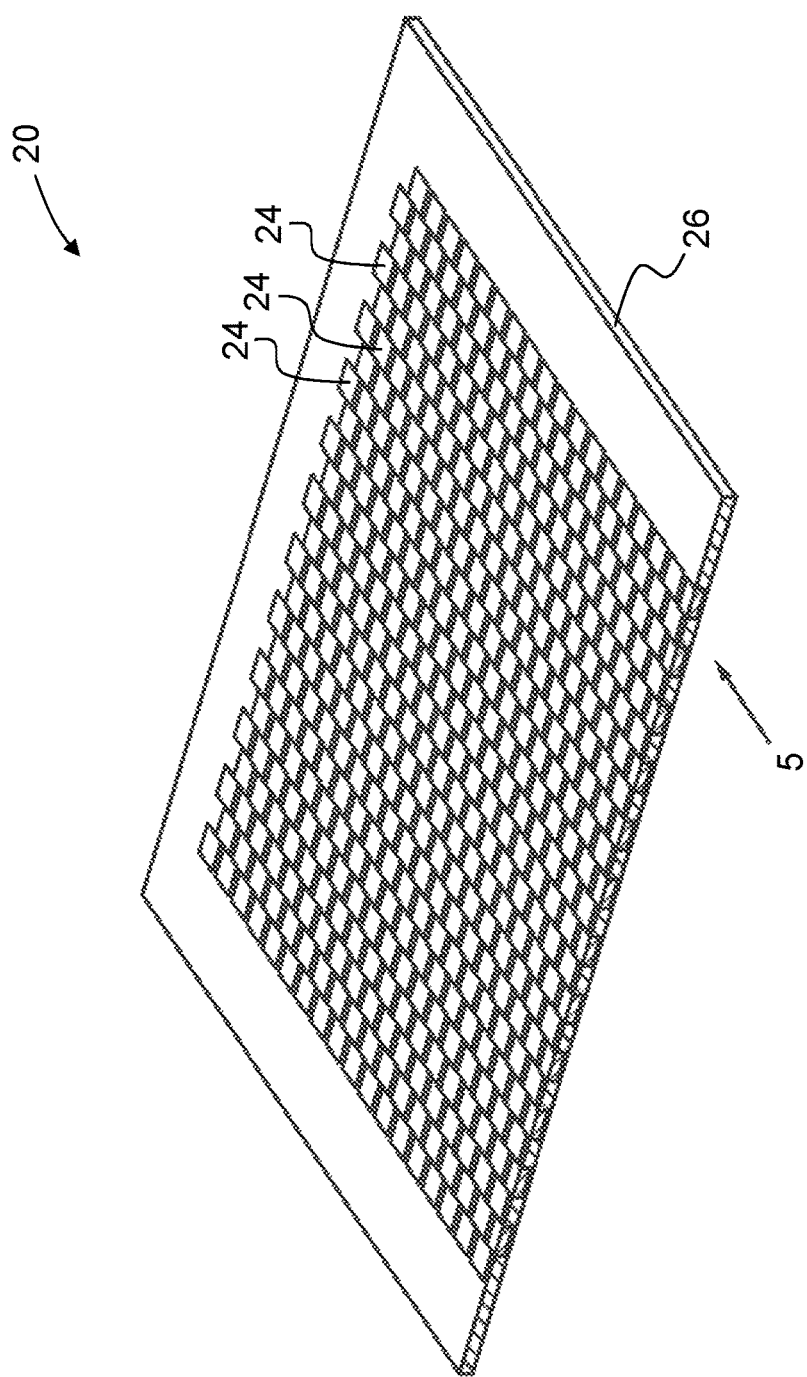
FIG. 4 is a perspective sectional view of a first layer accommodating permanent magnets and forming part of the removable fluid barrier of FIG. 1.
Figure 5:
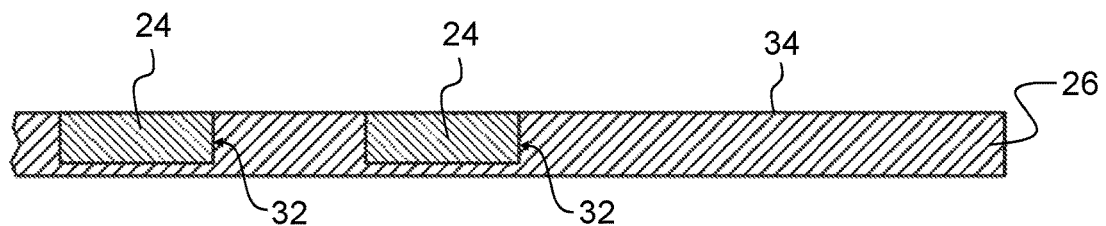
FIG. 5 is a fragmentary side view of a portion of the first layer and the permanent magnets of FIG. 4 indicated by reference numeral 5.

Turning now to FIGS. 1 to 6, a removable fluid barrier is shown and is generally indicated by reference numeral 20.

Removable fluid barrier 20 is configured to be magnetically fastened to a ruptured fluid vessel made of steel or other ferrous material, such as for example a rail tank car, to cover the rupture for reducing or preventing leakage of fluid therefrom.

The removable fluid barrier 20 comprises a generally planar flexible body 22 fabricated of one or more resilient materials and encapsulating a plurality of permanent magnets 24. The flexible body 22 comprises a first layer 26 and a second layer 28. In this embodiment, each of the first layer 26 and the second layer 28 is fabricated of polyurethane, and is formed by casting. Also in this embodiment, the flexible body 22 has a generally square shape, and has dimensions of about 30 inches×about 30 inches×about 0.5 inches.

The first layer 26 has an array of recesses 32 formed on one side thereof, with each recess 32 being sized and shaped to accommodate a permanent magnet 24. The array of recesses 32 is generally centered on one side of the first layer 26, and covers a large portion thereof, such that a margin 34 extends around its periphery. The recesses 32 are arranged in a densely spaced pattern within the array. In the embodiment shown, the recesses 32 are distributed over about 65% of the area of the first layer 26, and the recesses 32 are interconnected such that adjacent permanent magnets 24 abut.

The second layer 28 has generally identical dimensions as the first layer 26. The second layer 28 is joined to the first layer 26, with the permanent magnets 24 accommodated therein, such that the first layer 26 and the second layer 28 provide an integrated, closed structure encapsulating the permanent magnets 24. The interface between the first layer 26 and the second layer 28 is strong, and has sufficient strength to remain joined during normal use of the removable fluid barrier 20. As a result of this strong interface, and as a result of the first layer 26 and the second layer 28 being fabricated of the same material, the flexible body 22 effectively has a unitary structure.

Figure 6:
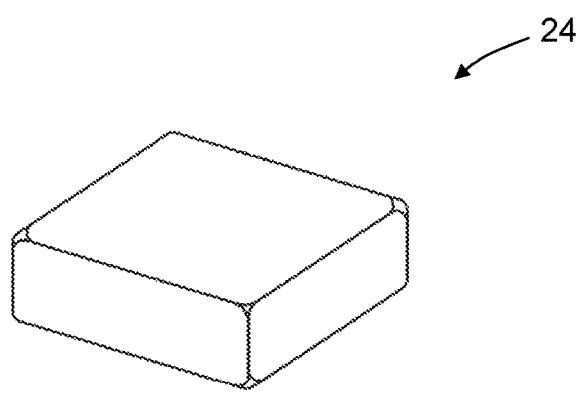
FIG. 6 is a perspective view of a permanent magnet forming part of the removable fluid barrier of FIG. 1.

FIG. 6 shows one of the permanent magnets 24. Each permanent magnet 24 is a rare earth magnet, and is fabricated of an alloy comprising one or more rare earth elements. Rare earth magnets are known to have a high magnetic strength, and more specifically a high energy product. As a result, the array of permanent magnets 24 enables the removable fluid barrier 20 to be very strongly magnetically fastened to ferrous structures. Each permanent magnet 24 is shaped so as to have two opposing faces, and is magnetically polarized such that each opposing face provides a respective one of the north pole or the south pole. Each permanent magnet 24 may be, for example, a grade N35 neodymium iron boron magnet, sold by United International Manufacture of Hong Kong.

Figure 7:
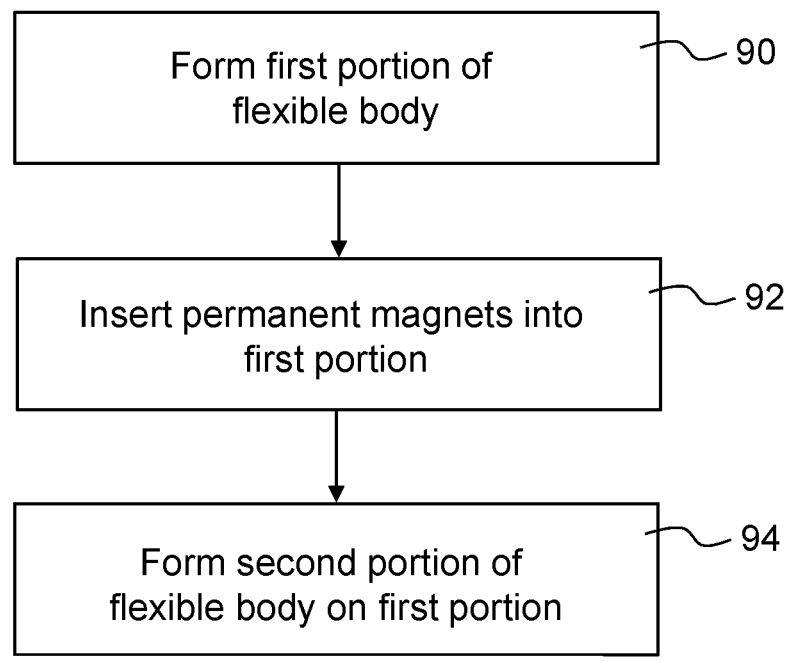
FIG. 7 is a flowchart of a method of manufacturing the removable fluid barrier of FIG. 1.
Figure 8:
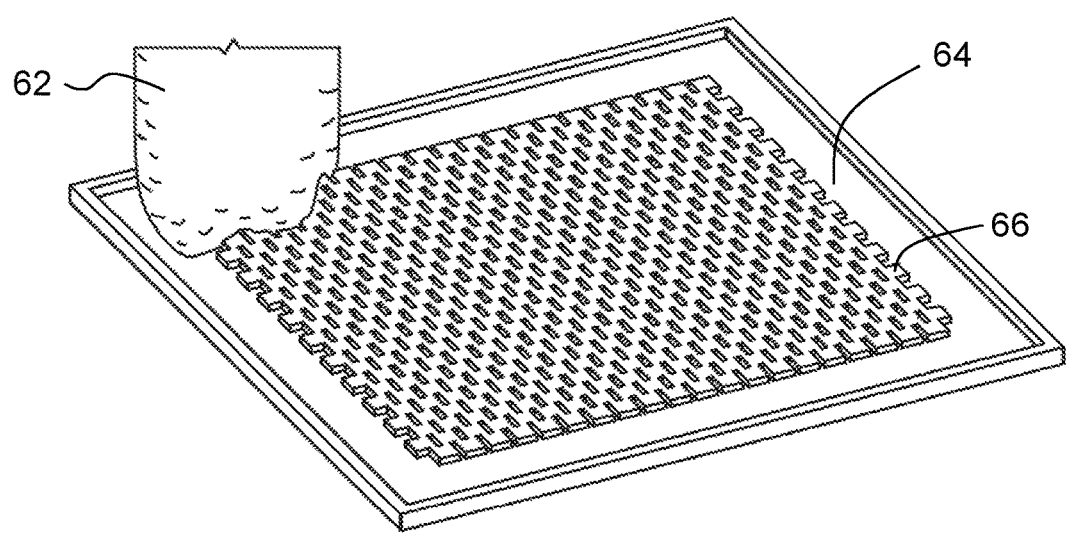
FIG. 8 is a perspective view of a first mold used to form the first layer.

FIG. 7 is a flowchart showing steps of a method of manufacturing a removable fluid barrier, such as the removable fluid barrier 20. First, the first layer 26 is cast by pouring polyurethane resin 62 into a first mold 64 comprising mold feature 66, as shown in FIG. 8. As will be understood, the mold feature 66 is shaped to form the array of recesses 32. The polyurethane resin 62 may be, for example, a thermoset polyurethane resin sold by Prothane of Milton, Ontario, Canada. Once the polyurethane resin 62 has cured within the mold 64, the first layer 26 is formed (step 90).

The first layer 26 is removed from the mold 64. The permanent magnets 24 are then inserted (not shown) into the recesses 32 of the first layer 26 (step 92). In this embodiment, the permanent magnets 24 are inserted such that their magnetic polarities all have the same orientation within the first layer 26.

Figure 9:
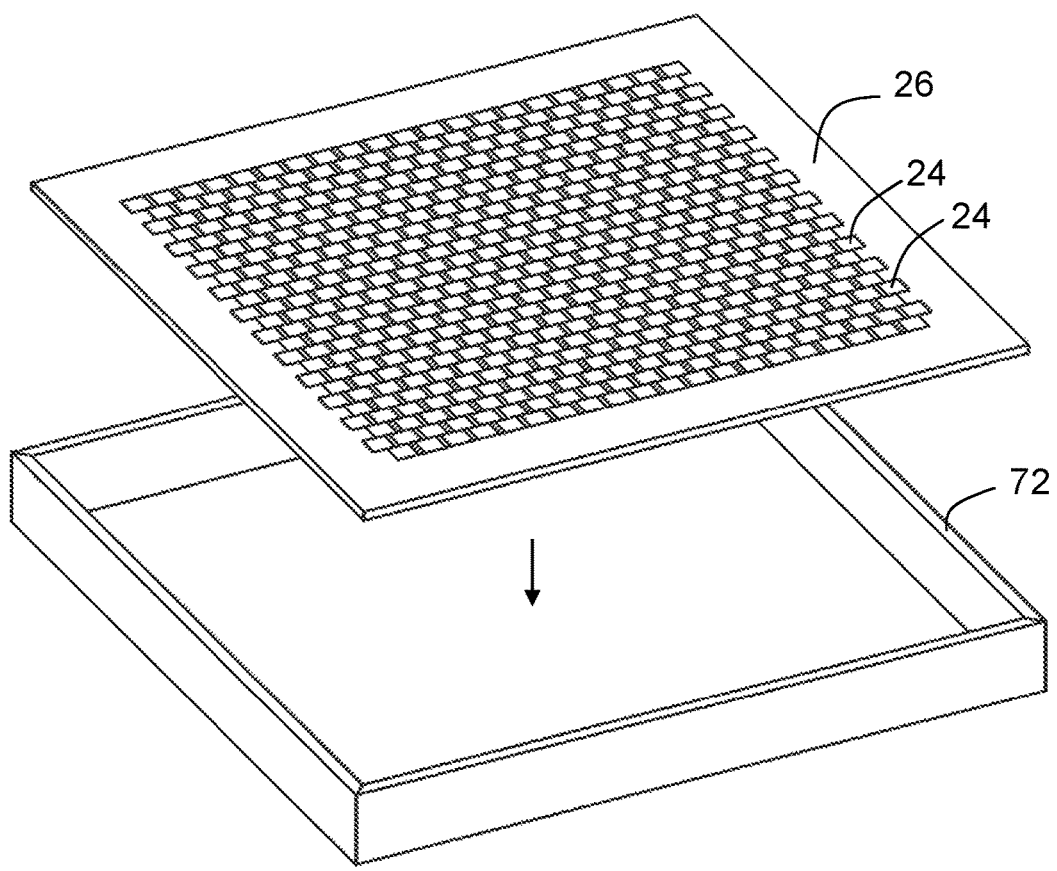
FIG. 9 is a perspective view of a second mold used to form a second layer forming part of the removable fluid barrier of FIG. 1.
Figure 10:
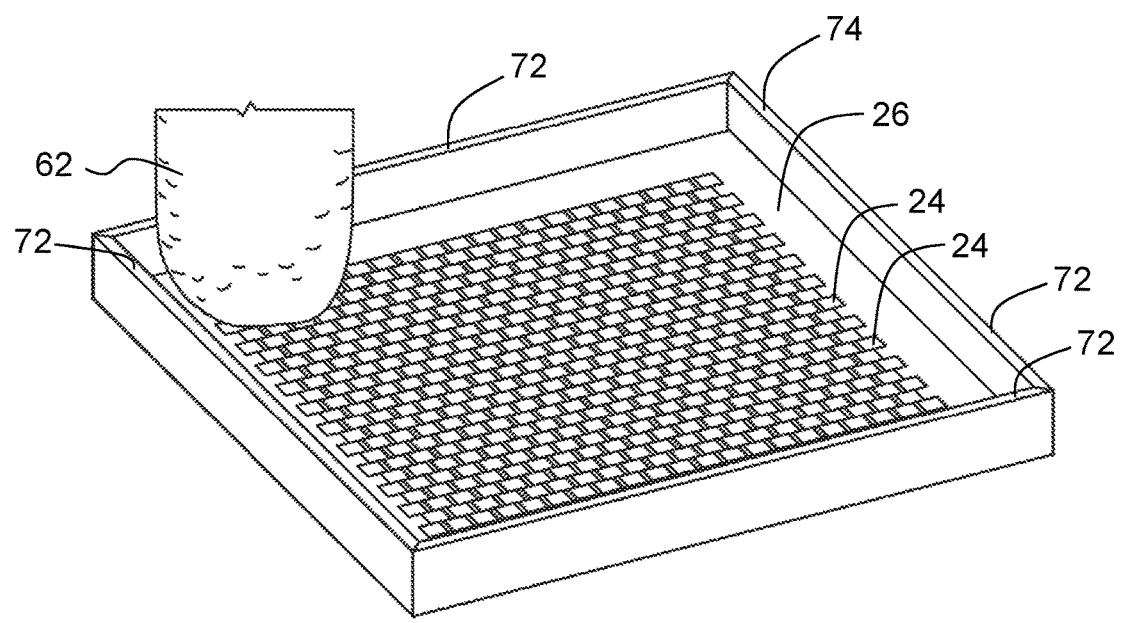
FIG. 10 is a perspective view of the second mold of FIG. 9, with the first layer accommodating the permanent magnets placed therein.

The first layer 26, with the permanent magnets 24 accommodated therein, is then placed into a second mold 72 which, in the embodiment shown, comprises four (4) aluminum sheets 74 assembled into a square frame, shown in FIG. 9. The second layer 28 is then cast by pouring polyurethane resin 62 into the second mold 72 and over the first layer 26 and the permanent magnets 24, as shown in FIG. 10. Once the polyurethane resin 62 has cured within the mold 72, the second layer 28 is formed (step 94).

In use, the removable fluid barrier 20 is applied to a ruptured ferrous fluid vessel (not shown) such that the removable fluid barrier 20 covers the rupture, and such that the first layer 26 contacts the ferrous fluid vessel around the rupture. The permanent magnets 24 provide a magnetic force of attraction to the ferrous fluid vessel. This magnetic force of attraction, in combination with the flexibility of the fluid barrier 20, causes the removable fluid barrier 20 to conform to and to become magnetically fastened to the ferrous fluid vessel. As will be understood, the flexibility of the removable fluid barrier 20 enables the removable fluid barrier 20 to conform to curvature of the ferrous fluid vessel. Further, the magnetic force of attraction, in combination with the flexibility of the first layer 26, causes the first layer 26 to compress against the ferrous fluid vessel, which thereby enables the removable fluid barrier 20 to effectively provide a fluid seal or an at least partial fluid seal around the rupture, so as to reduce or prevent the outflow of fluid through the rupture. In this manner, the outer surface of the first layer 26 defines a sealing surface of the removable fluid barrier 20.

It will be understood that the removable fluid barrier may alternatively be applied to the ruptured ferrous fluid vessel such that the second layer 28 contacts the ferrous fluid vessel. In such a case, the outer surface of the second layer defines a sealing surface of the removable fluid barrier.

The removable fluid barrier 20 may be removed by pulling an edge of the removable fluid barrier 20 away from the ferrous fluid vessel, and with sufficient force so as to overcome the magnetic force of attraction provided by the permanent magnets 24. The removable fluid barrier 20 may then be cleaned to remove fluid residue, if necessary, and may then be used for another application.

As an example, the removable fluid barrier 20 may be applied to a rupture any ferrous, low-pressure or unpressurized fluid vessel, such as for example a rail tank car, a highway transport tanker, a fluid storage tank, a drum container such as a 55 gallon drum, a low-pressure pipeline, and the like, so as to limit spillage of fluid from the fluid vessel. In such applications, the removable fluid barrier 20 may be used by emergency personnel, such as for example firefighters, to prevent or reduce leakage of fluid, such as hazardous liquid or gas.

As another example, the removable fluid barrier 20 may alternatively be applied to a ferrous drain structure, such as for example a sewer grate, a manhole cover, a floor drain cover, and the like, to reduce or prevent entry of fluid into the drain. In such applications, the removable fluid barrier 20 may be used by emergency personnel, such as for example firefighters, to prevent fluid spilled on a floor or ground surface from entering the drain, and to thereby contain the spill of fluid. The fluid may be hazardous liquid or gas.

As will be appreciated, the permanent magnets 24 fabricated of rare earth alloy advantageously provide a stronger magnetic force of attraction as compared to permanent magnets fabricated of other materials, such as for example ferrous permanent magnets. As will be understood, the stronger magnetic force of attraction provided by the permanent magnets 24 enables the removable fluid barrier 20 to become more strongly magnetically fastened to the ruptured ferrous fluid vessel, and to thereby withstand greater opposing forces arising from fluid pressure within the fluid vessel, as compared to conventional removable fluid barriers comprising ferrous permanent magnets.

As will be appreciated, the permanent magnets 24 allow the removable fluid barrier 20 to be magnetically fastened to the ruptured fluid vessel in a facile manner, and without the need to provide an electrical current and means for delivering such a current, as would be required for conventional removable fluid barriers comprising electromagnets. The permanent magnets 24 advantageously enable the removable fluid barrier 20 to be fastened quickly, which is particularly beneficial for emergency situations and situations involving hazardous materials.

As will be appreciated, the densely spaced configuration of the permanent magnets 24 advantageously enables the permanent magnets 24 to provide a much stronger total magnetic force of attraction over a given area, while allowing to the removable fluid barrier 20 to remain flexible, as compared to conventional fluid barriers comprising non-densely spaced configurations of magnets.

As will be appreciated, the removable fluid barrier 20 has a generally simple construction and consists of generally only three (3) components, namely the first layer 26, the plurality of permanent magnets 24, and the second layer 28. The simple construction advantageously allows the removable fluid barrier 20 to be manufactured at lower cost, as compared to conventional fluid barriers having more complex construction.

As will be appreciated, the use of a durable resilient material, such as polyurethane, for the first and second layers 26 and 28 advantageously enables these layers to provide sufficient structural integrity to contain the permanent magnets 24 during use, and to also each provide an outer surface that has sufficient flexibility to form a fluid seal against the fluid vessel.

As will be appreciated, the inclusion of a margin 34 in the first layer 26 allows the edges of the removable fluid barrier 20 to be easily lifted from the ferrous fluid vessel, which may effectively serve as a handle for facilitating removal of the removable fluid barrier 20.

Other configurations are possible. For example, although in the embodiment described above, the array of recesses covers only a portion of the first layer such that a margin extends around its periphery, in other embodiments, the removable fluid barrier may alternatively be configured such that substantially no margin extends around the periphery of the first layer. Such configurations may be desirable for removable fluid barriers of smaller size, for which the total magnetic force of attraction provided by the permanent magnets is less, and which therefore may be removed by pulling away from the ferrous fluid vessel using less force.

Figure 12:
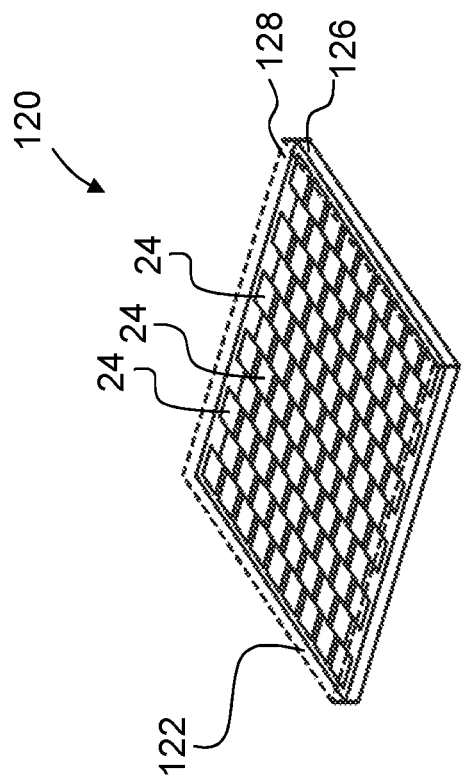
FIG. 12 is a perspective, partially transparent view of the removable fluid barrier of FIG. 11.
Figure 11:
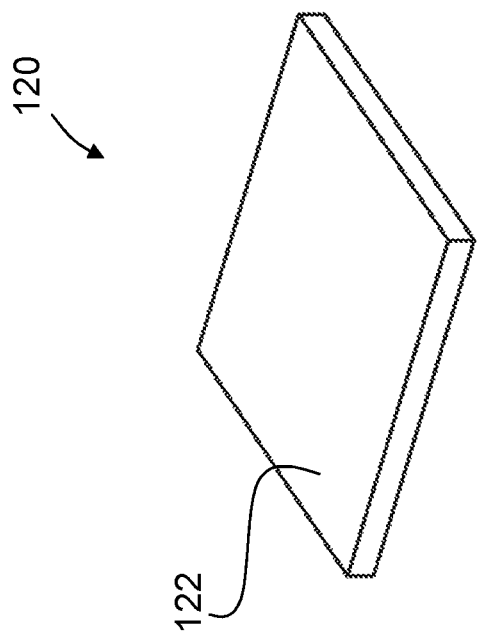
FIG. 11 is a perspective view of another embodiment of a removable fluid barrier.
Figure 13:
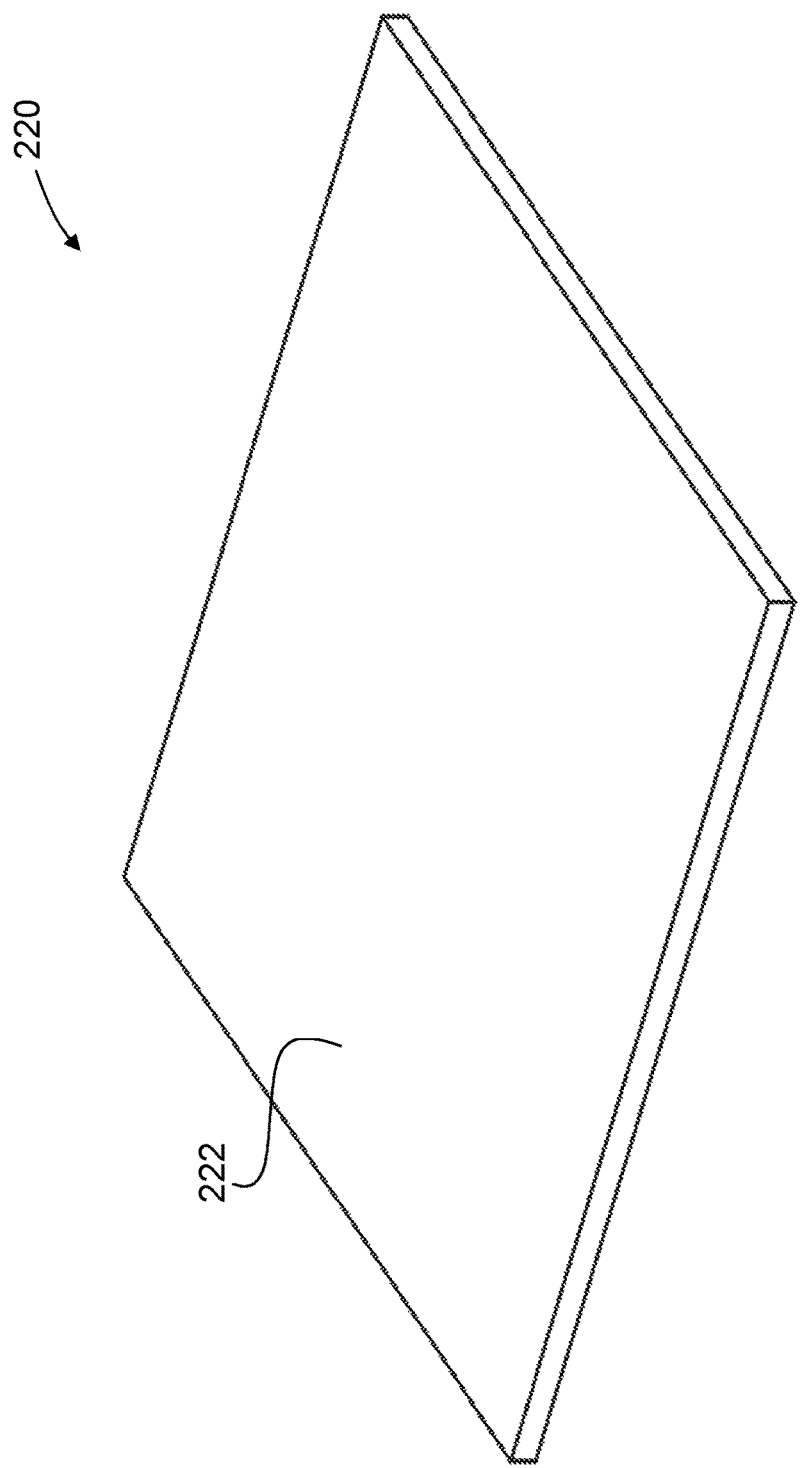
FIG. 13 is a perspective view of another embodiment of a removable fluid barrier.

For example, FIGS. 11 and 12 show another embodiment of a removable fluid barrier, which is generally indicated by reference numeral 120. Removable fluid barrier 120 is generally similar to removable fluid barrier 20 described above and with reference to FIGS. 1 to 6, and comprises a generally planar flexible body 122 fabricated of one or more resilient materials and encapsulating a plurality of permanent magnets 24. The flexible body 122 comprises a first layer 126 and a second layer 128, and in this embodiment, each of the first layer 126 and the second layer 128 is fabricated of polyurethane and is formed by casting. Also in this embodiment, the flexible body 122 has a generally square shape, and has dimensions of about 10 inches×about 10 inches×about 0.5 inches.

Similar to first layer 26 described above, the first layer 126 has an array of recesses (not shown) formed on one side thereof, with each recess being sized and shaped to accommodate a permanent magnet 24. The array of recesses is generally centered on the first layer 126. However, unlike the first layer 26 described above, the array of recesses covers generally the entirety of one side of the first layer 126, such that substantially no margin extends around its periphery. The recesses are arranged in a densely spaced pattern within the array. In this embodiment, the recesses are distributed across about 90% of the area of the first layer 126, and the recesses are interconnected such that adjacent permanent magnets 24 abut.

The second layer 128 has generally identical dimensions as the first layer 126. The second layer 128 is joined to the first layer 126, with the permanent magnets 24 accommodated therein, such that the first layer 126 and the second layer 128 provide an integrated, closed structure encapsulating the permanent magnets 24. The interface between the first layer 126 and the second layer 128 is strong, and has sufficient strength to remain joined during normal use of the removable fluid barrier 120. As a result of this strong interface, and as a result of the first layer 126 and the second layer 128 being fabricated of the same material, the flexible body 122 effectively has a unitary structure.

Although in the embodiment described above, the first layer and the second layer of the flexible body are both fabricated of polyurethane, in other embodiments, one or both of the first layer and the second layer may alternatively be fabricated of another suitable thermoset resin, from another suitable polymer, or from another suitable material, that provides suitable flexibility and suitable durability. In still other embodiments, an adhesive layer may alternatively be disposed between the first layer and the second layer.

Although in the embodiment described above, the first layer and the second layer are formed by casting, in other embodiments, one or both of the first layer and the second layer may alternatively be formed by another suitable method, such as for example injection molding, cutting from a slab of material, and the like.

Although in the embodiment described above, each permanent magnet is a rare earth magnet, in other embodiments, one or more of the permanent magnets may alternatively be ferrous magnets.

Still other configurations are possible. For example, FIGS. 13 to 16 show another embodiment of a removable fluid barrier, which is generally indicated by reference numeral 220. Removable fluid barrier 220 is configured to be magnetically fastened to a ruptured fluid vessel made of steel or other ferrous material, such as for example a rail tank car, to cover the rupture for reducing or preventing leakage of fluid therefrom.

The removable fluid barrier 220 comprises a generally planar flexible body 222 fabricated of one or more resilient materials and encapsulating a plurality of permanent magnets 230. The flexible body 222 has a single, unitary structure, and this embodiment the flexible body 222 is fabricated of polyurethane and is formed by casting. More specifically, the flexible body 222 is formed by a single casting, during which the permanent magnets 230 are encapsulated, and are thereby enclosed in the flexible body 222. In the example shown, the flexible body 222 has a generally square shape, and has dimensions of about 30 inches×about 30 inches×about 0.5 inches. The generally planar flexible body 222 has two opposing faces, namely a first face 232 and a second face 234. At least a portion of the first face 232 comprises a textured surface 236, which is formed by casting the flexible body 222 against a textured plate 240 during fabrication, as described below.

The permanent magnets 230 are encapsulated within the flexible body 222 generally adjacent the first face 232. In this embodiment, the flexible body 222 also encapsulates a reinforcement sheet 242, which is disposed within the flexible body 222 between the permanent magnets 230 and the first face 232. The reinforcement sheet 242 is fabricated of a flexible, resilient material, and is configured to provide reinforcement to the flexible body 222 for strengthening the fluid barrier 220. In this embodiment, the reinforcement sheet 242 is fabricated of fiberglass cloth. The reinforcement sheet 242 is separated from the first face 232 by a thin layer of the one or more resilient materials of which the flexible body 222 is fabricated, as may be seen in FIGS. 15 and 16. Similarly, the permanent magnets 230 are separated from the reinforcement sheet 242 by a thin layer of the one or more resilient materials of which the flexible body 222 is fabricated, as may be seen in FIGS. 15 and 16.

In the example shown, each permanent magnet 230 is disc shaped, and comprises a rare earth magnet body 252 fabricated of an alloy comprising one or more rare earth elements. Rare earth magnets are known to have a high magnetic strength, and more specifically a high energy product. As a result, the array of permanent magnets 230 enables the removable fluid barrier 220 to be very strongly magnetically fastened to ferrous structures. Each permanent magnet 230 is shaped so as to have two opposing faces, and is magnetically polarized such that each opposing face provides a respective one of the north pole or the south pole. Each permanent magnet 230 may be, for example, a grade N35 neodymium iron boron magnet, sold by United International Manufacture of Hong Kong.

Each permanent magnet 230 also comprises a ferromagnetic disc 254 that is magnetically fastened to the magnet body 252. It has been found by the inventor that the ferromagnetic disc 254 increases the magnetic force of attraction of the permanent magnet 230, and thereby increases the magnetic force of attraction of the removable fluid barrier 220 to the fluid vessel. In this embodiment, the ferromagnetic disc 254 is fabricated of a ferromagnetic material, such as steel, for example. Each permanent magnet 230 further comprises a thin epoxy coating 256 disposed on the outer surfaces of the magnet body 252 and the ferromagnetic disc 254, such that the epoxy coating 256 encapsulates the permanent magnet 230. As will be understood, the epoxy coating 256 increases the strength of the interface between the permanent magnet 230 and the flexible body 222.

Figure 14:
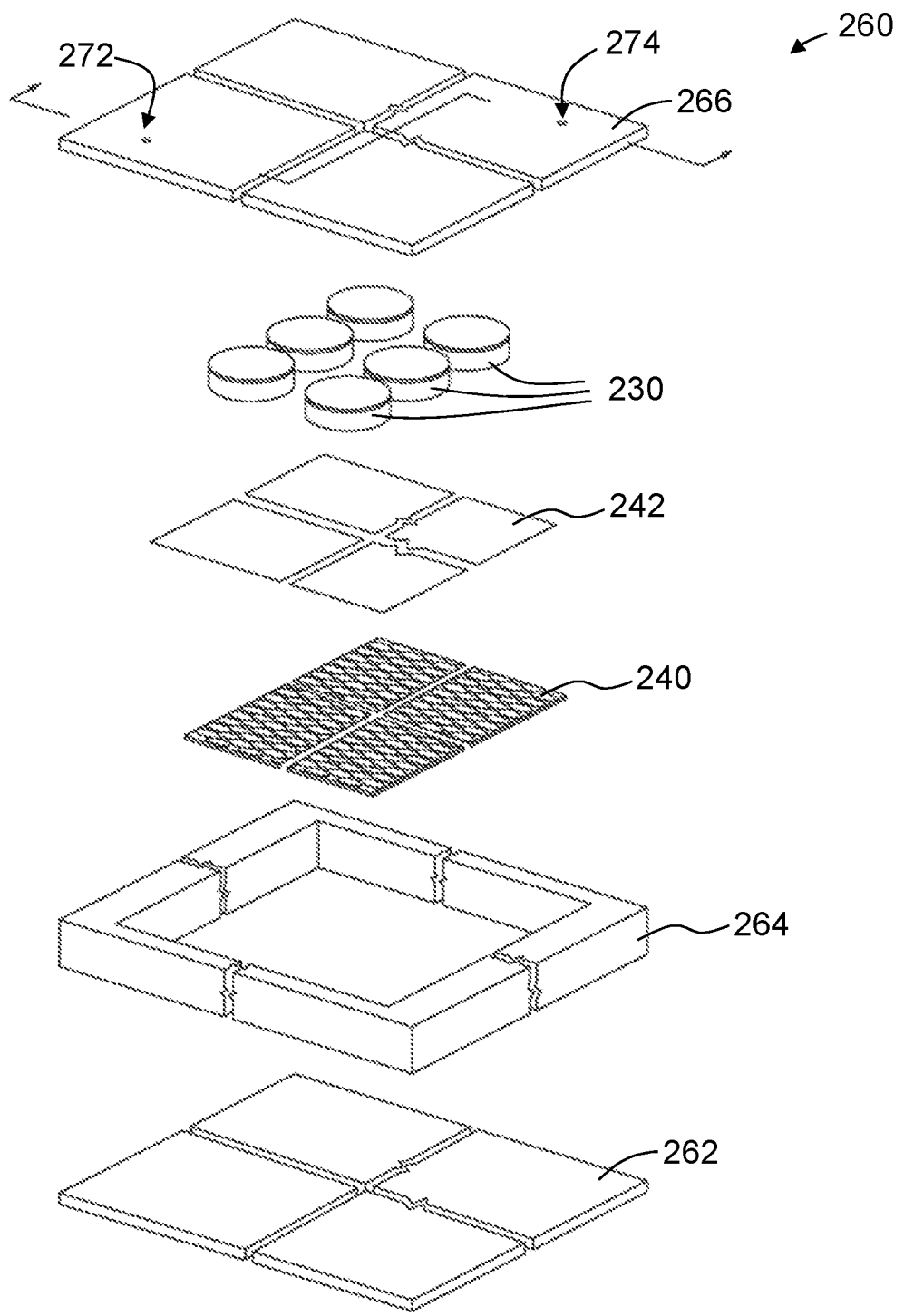
FIG. 14 is an exploded view of a portion of an assembly used to fabricate the removable fluid barrier of FIG. 13.

FIG. 14 shows a portion of an assembly 260 used to fabricate the removable fluid barrier 220. The assembly comprises a first face plate 262 fabricated of a ferromagnetic material, a spacer frame 264, and a second face plate 266. In this embodiment, the first face plate 262 is fabricated of steel. The first face plate 262, the spacer frame 264 and the second face plate 266, when assembled, define a mold cavity 268 for fabricating the removable fluid barrier 220. The second face plate 266 has a first aperture 272, through which liquid polymer resin used to fabricate the flexible body 222 is delivered. The second face plate 266 also has a second aperture 274, through which air displaced by the liquid polymer resin flowing through the mold cavity 268 is vented.

Figure 15:
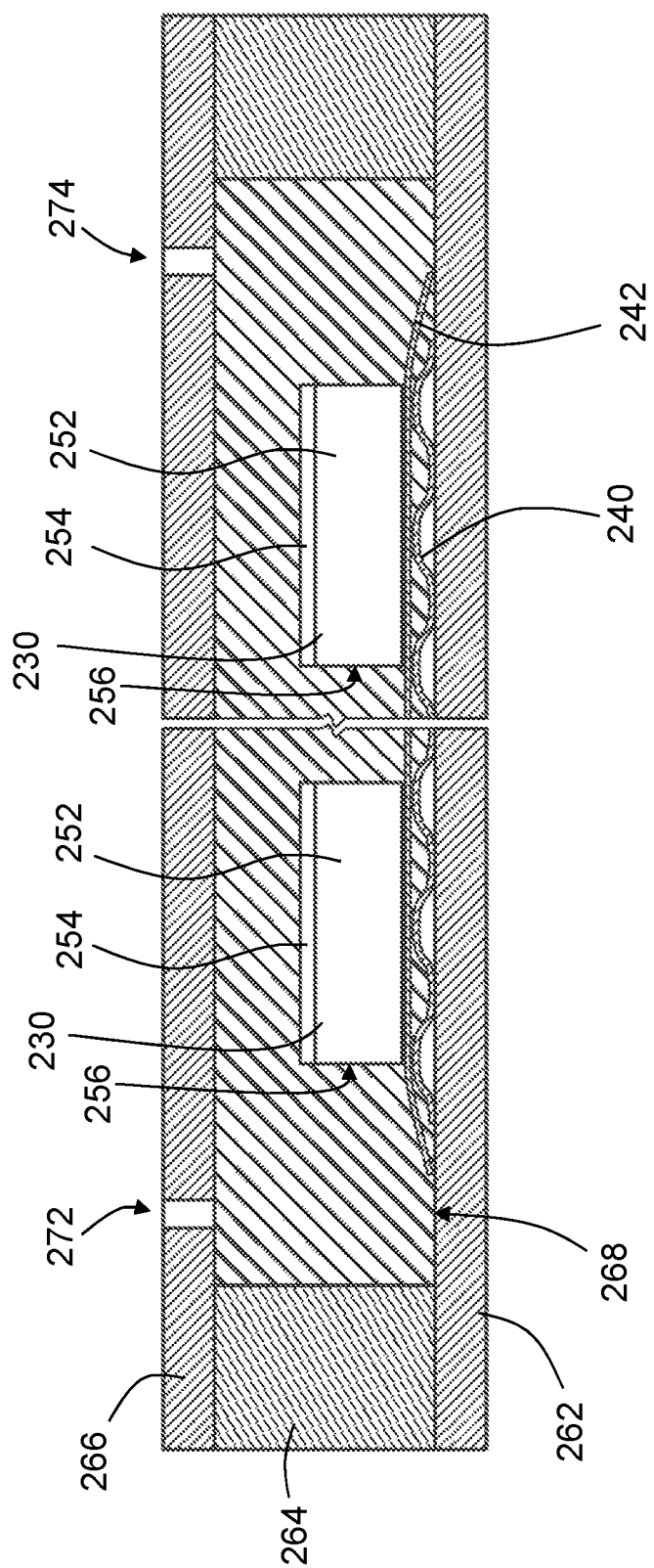
FIG. 15 is a side sectional view of the removable fluid barrier of FIG. 13, during fabrication and taken along the section line indicated in FIG. 14.
Figure 16:
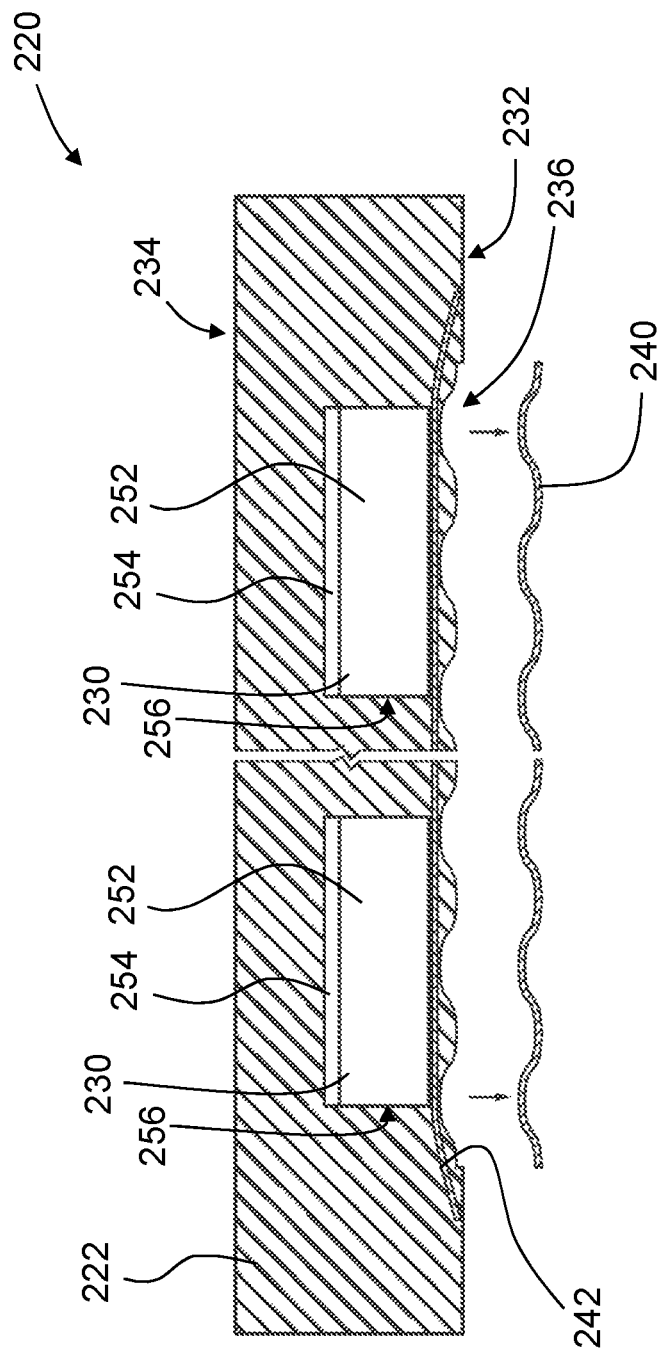
FIG. 16 is a side sectional view of the removable fluid barrier of FIG. 15.

During fabrication of the removable fluid barrier 220, the assembly 260 is assembled by placing the spacer frame 264 onto first face plate 262. The textured plate 240 is then disposed on the first face plate 262, generally centered within the area bordered by the spacer frame 264, and the reinforcement sheet 242 is then disposed on the textured plate 240. The textured plate 240 has non-planar surfaces and is fabricated of a non-ferromagnetic material. As will be understood, the non-planar surfaces of the textured plate 240 provide conduits through which the liquid polymer resin can flow during casting of the flexible body 222, so as to enable the reinforcement sheet 242 and the permanent magnets 230 to be encapsulated. In the embodiment shown, the textured plate 240 has dimpled surfaces, and is fabricated of an aluminum alloy. The permanent magnets 230 are then disposed on the portion of the reinforcement sheet 242 covering the textured plate 240, such that the textured plate 240 is interposed between each of the permanent magnets 230 and the first face plate 262. Each of the permanent magnets 230 is disposed on the reinforcement sheet 242 such that the ferromagnetic disc 254 is oriented away from the reinforcement sheet 242, as shown in FIGS. 14 to 16. As will be understood, placement of the permanent magnets 230 in this manner causes the permanent magnets 230 to be magnetically attracted to the first face plate 262 through the textured plate 240 and the reinforcement sheet 242. The second face plate 266 is then placed onto the spacer frame 264 to define the mold cavity 268.

The first face plate 262, the spacer frame 264 and the second face plate 266, with the reinforcement sheet 242, the textured plate 240 and the permanent magnets 230 inside, are then removably fastened together using one or more suitable fasteners (not shown). In this embodiment, the fasteners are C-clamps (not shown). The flexible body 222 is then cast by injecting the liquid polymer resin, which is delivered from a source (not shown) of liquid polymer resin via a suitable conduit (not shown), through the first aperture 272 into the mold cavity 268. Air in the mold cavity displaced by the advancing liquid polymer resin is vented through the second aperture 274. The liquid polymer resin fills the mold cavity and encapsulates the permanent magnets 230 and the reinforcement sheet 242 by flowing around the permanent magnets 230, between the permanent magnets 230 the reinforcement sheet 242, and between the reinforcement sheet 242 and the textured plate 240. The liquid polymer resin is then allowed to cure. Once cured, the flexible body 222, which encapsulates the permanent magnets 230 and the reinforcement sheet 242, is formed. The first face plate 262, the spacer frame 264 and the second face plate 266 are then unfastened, and the flexible body 222 with the textured plate 240 attached thereto are removed. The textured plate 240 is then separated from the flexible body 222, as shown in FIG. 16, yielding the removable fluid barrier 220.

In use, the removable fluid barrier 220 is applied to a ruptured ferrous fluid vessel (not shown) such that the removable fluid barrier 220 covers the rupture, and such that the first face 232 contacts the ferrous fluid vessel around the rupture. The permanent magnets 230 provide a magnetic force of attraction to the ferrous fluid vessel. This magnetic force of attraction, in combination with the flexibility of the fluid barrier 220, causes the removable fluid barrier 220 to conform to and to become magnetically fastened to the ferrous fluid vessel. As will be understood, the flexibility of the removable fluid barrier 220 enables the removable fluid barrier 220 to conform to curvature of the ferrous fluid vessel. Further, the magnetic force of attraction, in combination with the flexibility of the first face 232, causes the first face 232 to compress against the ferrous fluid vessel, which thereby enables the removable fluid barrier 220 to effectively provide a fluid seal or an at least partial fluid seal around the rupture, so as to reduce or prevent the outflow of fluid through the rupture. In this manner, the surface of the first face 232 defines a sealing surface of the removable fluid barrier 220.

It will be understood that the removable fluid barrier may alternatively be applied to the ruptured ferrous fluid vessel such that the second face 234 contacts the ferrous fluid vessel. In such a case, the surface of the second face 234 defines a sealing surface of the removable fluid barrier.

The removable fluid barrier 220 may be removed by pulling an edge of the removable fluid barrier 220 away from the ferrous fluid vessel, and with sufficient force so as to overcome the magnetic force of attraction provided by the permanent magnets 230. The removable fluid barrier 220 may then be cleaned to remove fluid residue, if necessary, and may then be used for another application.

As an example, the removable fluid barrier 220 may be applied to a rupture in any ferrous, low-pressure or unpressurized fluid vessel, such as for example a rail tank car, a highway transport tanker, a fluid storage tank, a drum container such as a 55 gallon drum, a low-pressure pipeline, and the like, so as to limit spillage of fluid from the fluid vessel. In such applications, the removable fluid barrier 220 may be used by emergency personnel, such as for example firefighters, to prevent or reduce leakage of fluid, such as hazardous liquid or gas.

As another example, the removable fluid barrier 220 may alternatively be applied to a ferrous drain structure, such as for example a sewer grate, a manhole cover, a floor drain cover, and the like, to reduce or prevent entry of fluid into the drain. In such applications, the removable fluid barrier 220 may be used by emergency personnel, such as for example firefighters, to prevent fluid spilled on a floor or ground surface from entering the drain, and to thereby contain the spill of fluid. The fluid may be hazardous liquid or gas.

As will be appreciated, the permanent magnets 230 fabricated of rare earth alloy advantageously provide a stronger magnetic force of attraction as compared to permanent magnets fabricated of other materials, such as for example ferrous permanent magnets. As will be understood, the stronger magnetic force of attraction provided by the permanent magnets 230 enables the removable fluid barrier 220 to become more strongly magnetically fastened to the ruptured ferrous fluid vessel, and to thereby withstand greater opposing forces arising from fluid pressure within the fluid vessel, as compared to conventional removable fluid barriers comprising ferrous permanent magnets.

As will be appreciated, the permanent magnets 230 allow the removable fluid barrier 220 to be magnetically fastened to the ruptured fluid vessel in a facile manner, and without the need to provide an electrical current and means for delivering such a current, as would be required for conventional removable fluid barriers comprising electromagnets. The permanent magnets 230 advantageously enable the removable fluid barrier 220 to be fastened quickly, which is particularly beneficial for emergency situations and situations involving hazardous materials.

As will be appreciated, the removable fluid barrier 220 has a generally simple construction and consists of generally only three (3) components, namely the flexible body 222, the plurality of permanent magnets 230, and the reinforcement sheet 242. The simple construction advantageously allows the removable fluid barrier 220 to be manufactured at lower cost, as compared to conventional fluid barriers having more complex construction.

As will be appreciated, the flexible body 222, which is formed by a single casting during which the permanent magnets 230 are encapsulated, has a single, unitary structure, and therefore lacks a seam surface or weld surface that would otherwise be present in conventional fluid barriers comprising flexible bodies that are fabricated by more than one (1) casting and that comprise multiple layers. As will be understood, the single, unitary structure of the flexible body 222 improves the structural integrity of the fluid barrier 220, as compared to conventional fluid barriers comprising multiple layers.

As will be appreciated, the inclusion of a margin in the flexible body 222 allows the edges of the removable fluid barrier 20 to be easily lifted from the ferrous fluid vessel, which may effectively serve as a handle for facilitating removal of the removable fluid barrier 220.

Other configurations are possible. For example, the flexible body may alternatively have a handle in the shape of a loop formed at one or more corners, and/or at one or more sides thereof. The handle may be a loop or an extension of the same material of which the flexible body is fabricated. Alternatively, the handle may comprise a component integrated into the flexible body during fabrication, and which either protrudes from the flexible body or is accessible from the surface of the flexible body.

One or more of the permanent magnets may alternatively be electromagnets. In one such embodiment, the flexible body may comprise suitable wiring and/or electronic components accessible from the surface of the flexible body for delivering electrical current to the one or more electromagnets for activating the electromagnets.

Although in the embodiment described above, the flexible body 222 comprises a textured surface 236 that is formed by casting the liquid polymer resin against a textured plate 240, in other embodiments, the textured surface 236 may alternatively be formed by casting the liquid polymer resin against any surface having a non-planar topography, so as to create a textured surface having a non-planar topography. In one such embodiment, the surface having the non-planar topography may be, for example, a plate having a one or more of a grooved surface, a ridged surface, a dimpled surface, a perforated surface, a scored surface, and the like. As will be understood, the non-planar topography may comprise a patterned topography or a non-patterned topography.

Although in the embodiment described above, the permanent magnet 230 comprises a ferromagnetic disc 254 that is magnetically fastened to the magnet body 252, in other embodiments, two or more of the magnet bodies 252 may alternatively be magnetically fastened to a single ferromagnetic plate fabricated of a ferromagnetic material. In one such embodiment, the single ferromagnetic plate may be a steel sheet, a steel plate, and the like, to which the plurality of magnet bodies 252 are magnetically fastened.

Although in the embodiment described above, the reinforcement sheet is fabricated of fiberglass cloth, in other embodiments, the reinforcement sheet may alternatively be fabricated of any flexible, resilient material, such as KEVLAR™ fabric, KEVLAR™ mesh, or a resilient fabric or a resilient mesh fabricated of one or more materials having adequate strength to provide reinforcement to the fluid barrier.

Although embodiments have been described above with reference to the accompanying drawings, those of skill in the art will appreciate that variations and modifications may be made without departing from the scope thereof as defined by the appended claims.

What is claimed is:

1. A removable fluid barrier, comprising:
a generally planar flexible body fabricated of at least one resilient material, the flexible body having a single, continuous structure enclosing a plurality of permanent magnets and a reinforcement sheet, the flexible body having opposing faces comprising a first face and a second face, at least one of the opposing faces defining a sealing surface of the removable fluid barrier,
wherein the plurality of permanent magnets are positioned closer to the first face of than to the second face, the reinforcement sheet being disposed between the permanent magnets and the first face of the flexible body.

2. The removable fluid barrier of claim 1, wherein the flexible body is formed by a single casting.

3. The removable fluid barrier of claim 1, wherein the reinforcement sheet is selected from the group consisting of fiberglass cloth, and a resilient fabric or a resilient mesh fabricated of one or more other materials.

4. The removable fluid barrier of claim 1, wherein the first face of the flexible body comprises a textured surface.

5. The removable fluid barrier of claim 4, wherein the textured surface has a non-planar topography.

6. The removable fluid barrier of claim 1, wherein the plurality of permanent magnets comprises one or more rare earth magnets.

7. The removable fluid barrier of claim 1, wherein each of the permanent magnets comprises an epoxy coating.

8. The removable fluid barrier of claim 1, wherein each of the permanent magnets comprises a magnet body and ferromagnetic plate.

9. The removable fluid barrier of claim 8, wherein the ferromagnetic plate is a steel disc.

10. The removable fluid barrier of claim 8, wherein the magnet body is a rare earth magnet.

11. The removable fluid barrier of claim 1, wherein the permanent magnets comprise two or more magnet bodies magnetically fastened to a ferromagnetic plate.

12. The removable fluid barrier of claim 11, wherein the ferromagnetic plate is a steel plate or a steel sheet.

13. The removable fluid barrier of claim 11, wherein each of the magnet bodies is a rare earth magnet.

14. The removable fluid barrier of claim 1, wherein the at least one resilient material comprises a polymer.

15. The removable fluid barrier of claim 1, wherein the flexible body is fabricated of polyurethane.

* * * * *